A. M. & E. NEWELL.
BAND SAW GUIDE.
APPLICATION FILED APR. 21, 1913.

1,086,074.

Patented Feb. 3, 1914.
2 SHEETS—SHEET 1.

WITNESSES
Ella McConnell
Lois Wineman

INVENTORS
Atwood M. Newell
Edgar Newell,
By J. M. Herbst
Atty.

A. M. & E. NEWELL.
BAND SAW GUIDE.
APPLICATION FILED APR. 21, 1913.
1,086,074.
Patented Feb. 3, 1914.
2 SHEETS—SHEET 2.
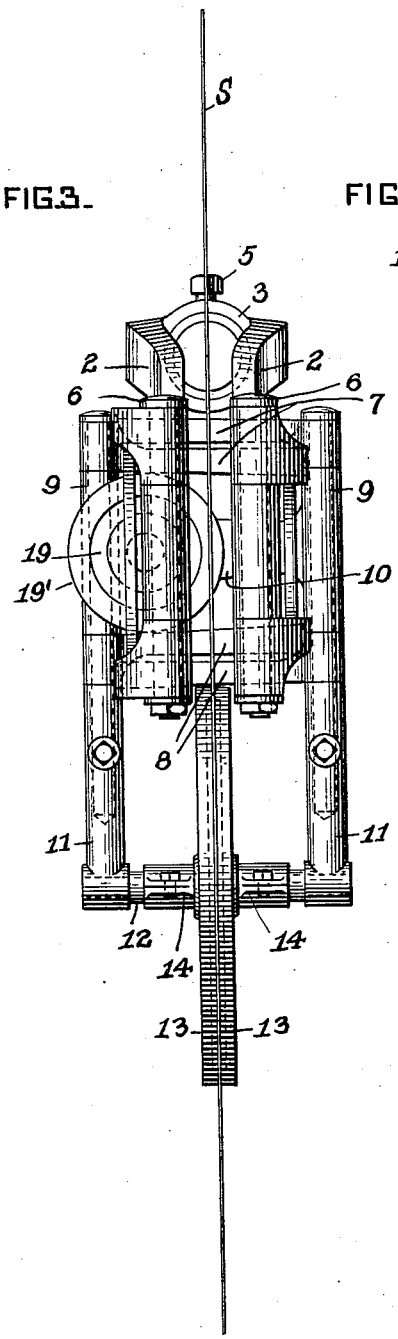
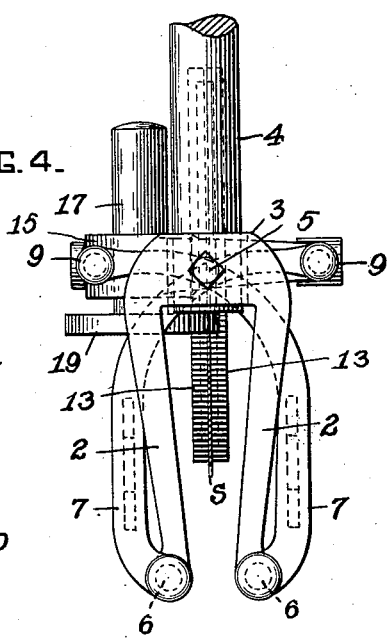
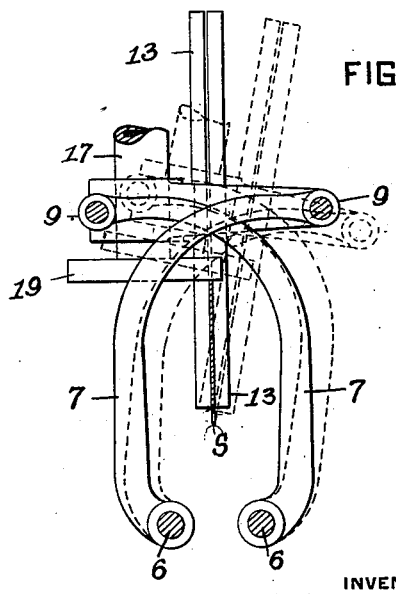
WITNESSES
Ella McConnell
Lois Wineman.
INVENTORS
Atwood M. Newell,
Edgar Newell,
By J. M. Nesbit
atty.

UNITED STATES PATENT OFFICE.

ATWOOD M. NEWELL AND EDGAR NEWELL, OF IRWIN, PENNSYLVANIA.

BAND-SAW GUIDE.

1,086,074.  Specification of Letters Patent.  Patented Feb. 3, 1914.

Application filed April 21, 1913. Serial No. 762,455.

*To all whom it may concern:*

Be it known that we, ATWOOD M. NEWELL and EDGAR NEWELL, both being citizens of the United States, and residents of Irwin, in the county of Westmoreland and State of Pennsylvania, have invented certain new and useful Improvements in Band-Saw Guides, of which the following is a specification.

The object of this invention is to provide a saw guide which operates to so manipulate the saw when its cutting edge is deflected from its normal path as to cause the saw to automatically return to and maintain such path, whereby deflection from whatever cause can continue only momentarily, the saw-truing movement of the guide becoming active immediately upon development of the slightest deflection. Provision is had whereby the guide reinforces the saw at its back or rear edge as well as its opposite faces so that the saw is within the full control of the guiding mechanism.

The invention is designed primarily as a guide for band saws and while such an adaptation is here shown and described the invention is not necessarily restricted to saws of this type.

It will also be understood that the invention may be utilized regardless of the material upon which the saw may operate.

Figure 1:
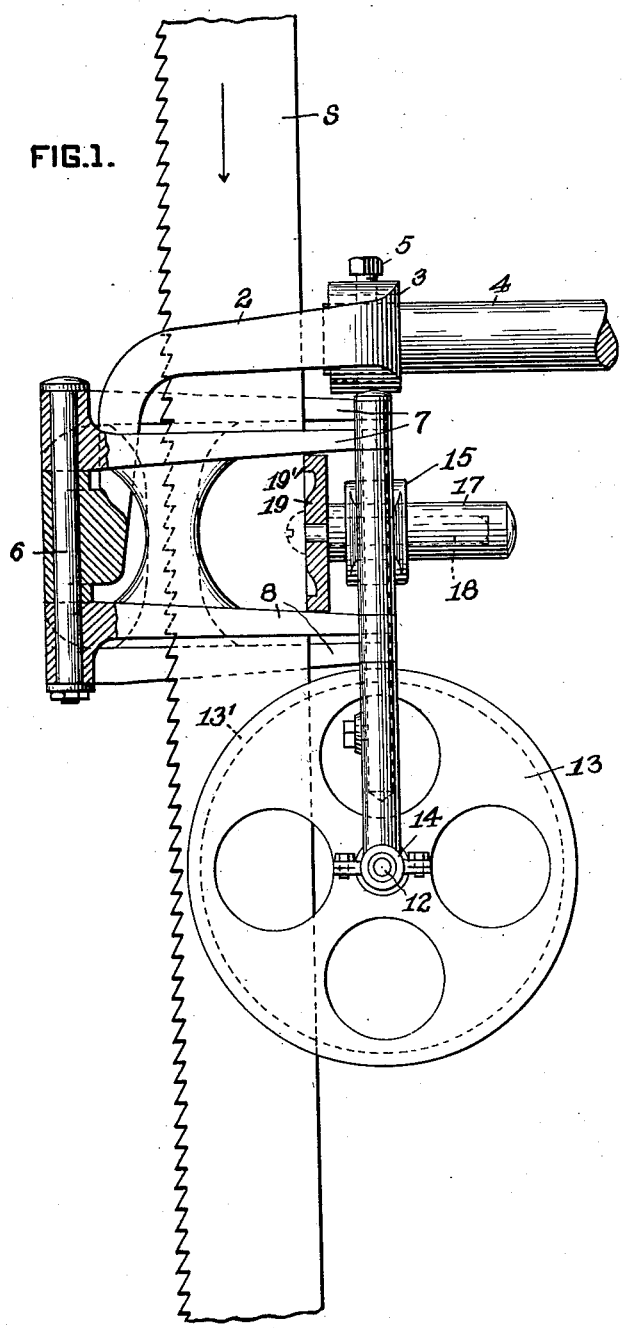
Figure 2:
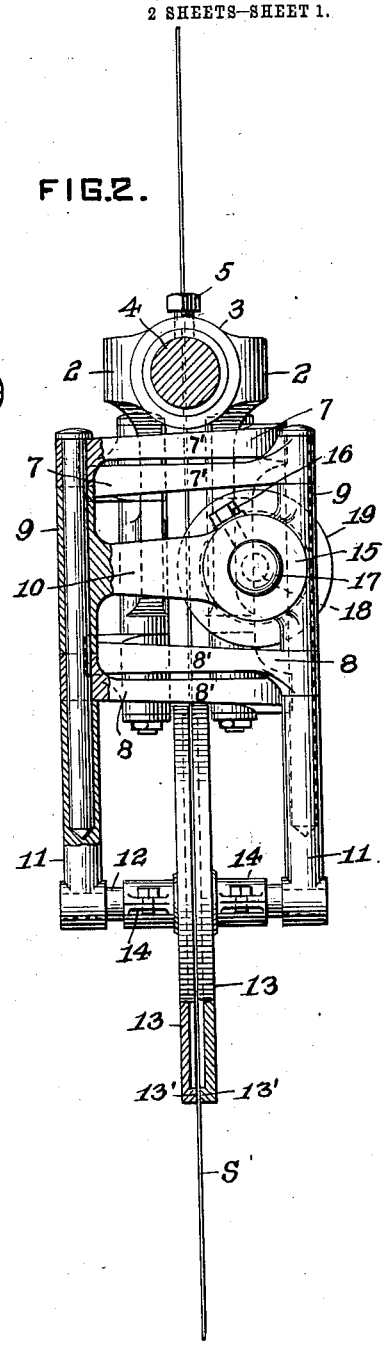

In the accompanying drawings, Figure 1 is a side elevation of the improved guide which is arranged for band saw use, and Figs. 2 and 3 are rear and front elevations, respectively, of the same. Fig. 4 is a top plan of the guide, and Fig. 5 a diagrammatic plan illustrating the operation of the guide.

Referring to the drawings, fixed arms 2 are arranged at opposite sides of the path of travel of saw S, the arms extending from the socket 3 located at the rear of the saw with the socket adjustably secured to any suitable supporting arm or bar 4 by means of set screw 5. The forward portions of arms 2 are deflected downwardly and each arm carries a vertical hinge pin 6. Mounted on each of said pins is a pair of backwardly extending arms arranged one above the other, the upper arm of each pair being designated 7, and the lower arm 8. The arms extend to the rear of the saw path with the rear portions of the upper and lower arms crossing each other, as indicated at 7' and 8', respectively. The extremities of the crossed arms are hinged to the vertical posts or rods 9, the latter being rigidly connected between the upper and lower sets of arms by cross frame or bracket 10. Secured on the extremities of posts 9 are the socket-formed bearing arms 11 in which is journaled shaft 12 which carries the guiding disks 13, the latter being secured to the shaft by the split hubs 14. The disks extend across the opposite faces of the saw nearly to the cutting edge thereof and are spaced apart sufficiently to permit the saw to move without interference when in its normal path.

Bracket 10 is formed with socket 15 and set screw 16 for adjustably supporting bearing 17 in which rotates spindle 18 of guide disk 19 for the back edge of the saw. Disks 13 and 19 are formed with the hardened peripheral rim or face portions 13' and 19', respectively, which resist the wear incident to engagement with the saw.

From the foregoing description it will be seen that arms 2 comprise hinge supports for the swinging arms 7 and 8, and the latter, in turn, constitute an oscillating support for the guide disks 13, likewise the back guide 19. The parts are so arranged that the saw teeth are approximately at the center of oscillation of guide disks 13, and as the frontmost portions of the disks' peripheries are slightly rearward from such center line, such forward portions are capable of slight displacement laterally or away from the path of the saw. If a deflecting obstruction is encountered, the lateral pressure of the saw upon the corresponding guide disk will deflect the disks, for instance as shown in dotted lines in Fig. 5. While the deflection of the guide at its portion nearest the saw teeth is very slight, it increases progressively backwardly or toward the back edge of the saw, the guide disks moving in a curved path with the axis of such movement located approximately in the portion of the guide nearest the teeth. The result is that while the toothed edge is maintained constantly substantially in its true path, the disturbing deflection causes the saw body to be moved or skewed in a direction which sets the teeth in a line or plane opposed or counter to the deflection with the result that the saw automatically rights itself. The action is of course the same regardless of the direction in which the saw is deflected, and as the back guide 19 moves with the side guides 13 the saw is positively guided and reinforced at all times.

The guides should be located as near as is practicable to the work, in the present adaptation the active portion of the downwardly traveling band being as close as may be to guide disks 13. The disturbing deflections thus occur in close proximity to the guide so that the latter is immediately effective in straightening out the saw into its normal path. With the guide properly adjusted relatively to the saw the truing action is accomplished automatically, lateral deflection of the saw in either direction causing the blade to immediately and automatically right itself and return to its normal path of travel.

We claim:—

1. The combination with a band saw, of a saw embracing guide adapted to move laterally when the saw is deflected from its normal path, and means actuated by the lateral movement of the guide for causing the latter to twist the body of the saw in the direction in which its cutting edge is deflected.

2. The combination of a saw embracing guide movable laterally relatively to the normal path of the saw and located adjacent to the cutting edge of the saw and extending backwardly therefrom, and means for causing the guide to move in a curved path under lateral pressure from the saw with the portion of the guide nearest the cutting edge of the saw approximately coincident with the center of such turning movement.

3. In a saw guide, the combination of crossed arms pivoted to swing in planes at right angles to the path of movement of a saw, a saw-embracing guide, and a support for the guide pivotally connected to the crossed arms and adapted to be oscillated by the latter.

4. In a saw guide, the combination of two guide-forming disks spaced apart to receive a saw, a disk-supporting journal at the rear of the path of the saw with the disks extending forwardly toward the cutting edge of the saw, a support for the disk journal pivoted to move laterally relatively to the path of movement of the saw, and means actuated by lateral deflection of the saw for moving the support laterally in the arc of a circle thereby causing the disks to twist the saw and direct the teeth thereof into the normal path of movement of the saw.

5. In a saw guide, the combination of swinging arms supported in advance of the cutting edge of a saw and extending to the rear of the path of the saw and crossing each other, a saw guide extending from the back of the saw toward the cutting edge thereof, and a support for the guide pivotally connected to the crossed arms and adapted to be moved thereby in a curved path when the guide is pressed laterally by the saw.

6. In a saw guide, the combination of two spindles located in advance of the cutting edge of a saw, arms extending from the spindles to the rear of the path of the saw and crossing each other with said spindles defining axes about which the arms turn, a saw guide extending from the back of the saw toward the cutting edge thereof, and a support for the guide pivotally connected to the crossed arms and adapted to be moved thereby in a curved path when the guide is pressed laterally by the saw.

7. In a saw guide, the combination of two spindles supported in advance of the cutting edge of a saw, arms swinging on the spindles and extending to the rear of the path of the saw and crossing each other, a frame pivotally supported at the rear of the saw by the crossed arms, and a saw guide carried by the frame and extending along either side of the saw toward its cutting edge.

8. The combination of a saw guide movable laterally relatively to the normal path of the saw with the guide adapted to engage the saw adjacent its cutting edge and for a distance backwardly from said edge, and movable guide-supporting means adapted to progressively increase the lateral movement of the guide backwardly from the portion of the latter nearest the cutting edge of the saw.

9. In a saw guide, the combination of two spindles located in advance of the cutting edge of a saw, arms extending from the spindles to the rear of the path of the saw with said spindles defining the axes about which the arms turn, a saw guide extending from the back of the saw toward the cutting edge thereof, and a support for the guide carried by the said arms and adapted to be moved thereby in a curved path when the guide is pressed laterally by the saw.

10. In a saw guide, the combination of two spindles located in advance of the cutting edge of a saw, arms extending from said spindles to the rear of the path of the saw and crossing each other, a frame pivotally supported at the rear of the saw by the crossed arms, a saw guide carried by the frame and extending along either side of the saw toward its cutting edge, and a reinforcement for the back edge of the saw movable with said frame.

11. In a saw guide, the combination of two supports located in advance of the cutting edge of the saw, two sets of arms pivoted to the supports and extending to the rear of the saw with the arms of each set crossing each other, two connected posts—one for each set of arms and pivoted to the rear portion of the latter, and a rotatable saw-embracing guide journaled in the posts and extending from the rear of the saw at either side thereof toward its cutting edge.

12. In a saw guide, the combination of two supports located in advance of the cutting edge of the saw, two sets of arms pivoted to the supports and extending to the rear of the saw with the sets crossing each other, two connected posts—one for each set of arms and pivoted to the rear portion of the latter, and two guide-forming disks rotatably supported by the posts with the disks extending along either side of the saw from the rear edge thereof toward its cutting edge.

13. The combination of a two-arm support sustained at the rear of the path of a saw with the arms extending forwardly at either side thereof, backwardly extending crossed arms hinged to the supporting arms and extending to the rear of the path of the saw, means pivotally connecting the rear portions of said backwardly extending arms, a guide support secured to and adapted to be oscillated by the connected arms, and a saw guide carried by the guide support and extending across each face of the saw from its back edge toward its cutting edge.

In testimony whereof we affix our signatures in presence of two witnesses.

ATWOOD M. NEWELL.
EDGAR NEWELL.

Witnesses:
A. M. CUNNINGHAM,
K. W. WALLACE.

Copies of this patent may be obtained for five cents each, by addressing the "Commissioner of Patents, Washington, D. C."